July 7, 1953     H. A. WYMAN, JR     2,644,316
WATER COOLING ARRANGEMENT FOR REFRIGERATORS
Filed June 10, 1950
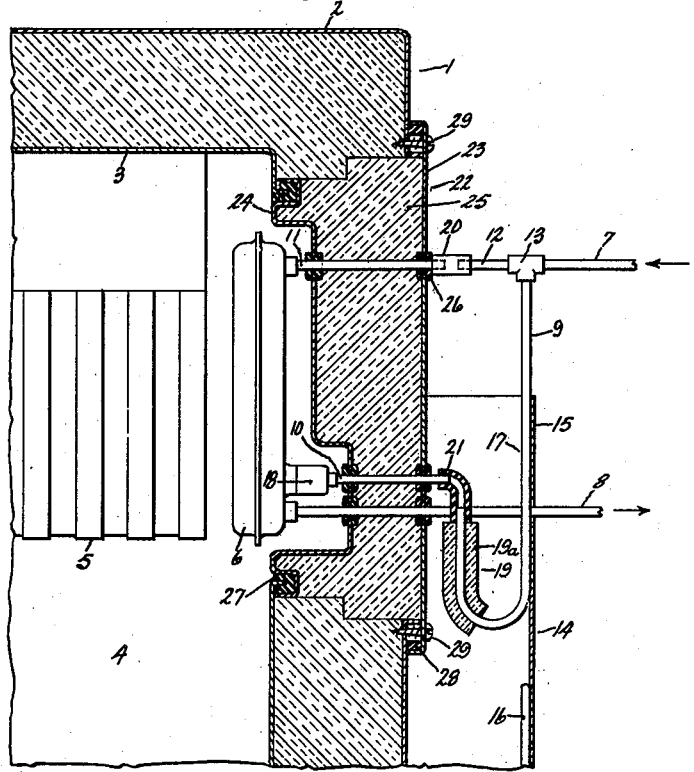
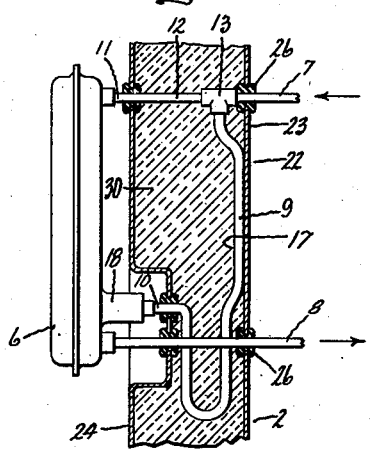
Inventor:
Howard A. Wyman, Jr,
by William B. Edwards, Jr.
His Attorney.

Patented July 7, 1953

2,644,316

UNITED STATES PATENT OFFICE 2,644,316

WATER COOLING ARRANGEMENT FOR REFRIGERATORS

Howard A. Wyman, Jr., Wesleyville, Pa., assignor to General Electric Company, a corporation of New York Application June 10, 1950, Serial No. 167,422

9 Claims. (Cl. 62—7)

My invention relates to water cooling arrangements for refrigerators and the like and more particularly to arrangements for controlling the temperature of water in a storage container.

It is sometimes desirable to provide a water cooling arrangement for household refrigerators and the like in order to insure a continuous supply of cooled water. This may be accomplished, for example, by mounting a storage container generally adjacent the evaporator of a refrigerator for cooling the water therein and by connecting the main water line to this storage tank so as to provide a continuous supply of water. Such an arrangement presents the difficulty, however, that the evaporator is usually operated substantially below the freezing point of water, and, particularly during relatively long periods of inactivity of the water cooling arrangement, the water in the storage container may be cooled below the freezing point. By my arrangement the freezing of water within the storage container is prevented.

Accordingly it is an object of my invention to provide an improved water cooling arrangement for refrigerators and the like including provision for maintaining water above a predetermined minimum temperature.

It is another object of my invention to provide an improved water cooling arrangement for refrigerators and the like including provision for automatically supplying heat to maintain the water above a predetermined minimum temperature.

Further objects and advantages of my invention will become apparent as the following description proceeds, and the features of novelty which characterize my invention will be pointed out with particularity in the claims annexed to and forming part of this specification.

In carrying out the objects of my invention a storage container is positioned within a refrigerator generally adjacent the evaporator, and a conduit is connected in closed circuit with the storage container. Heat is applied to water flowing through this conduit to maintain the water in the storage container above a predetermined minimum temperature. The supplying of heat may be accomplished by positioning a portion of the conduit adjacent a condenser associated with the refrigerator, by positioning a portion of the conduit adjacent the outer wall of the usual spaced wall refrigerator, or by subjecting a portion of the conduit to ambient temperature.

For a better understanding of my invention reference may be had to the accompanying drawing in which Fig. 1 is a view, partly in section, of a portion of a refrigerator cabinet embodying my invention; and Fig. 2 shows a modified form of my invention.

Referring to Fig. 1, there is shown a refrigerator 1 including an outer wall 2 and an inner wall 3 which defines a food storage compartment 4. An evaporator 5 is mounted in the upper portion of the food storage compartment 4 for cooling this compartment.

In order to provide a continuous supply of cool water, the storage container 6 is positioned adjacent the evaporator 5, this container serving to maintain a substantial body of water in the relatively cool area adjacent the evaporator 5. Water is supplied to the storage container 6 at the top portion thereof through a conduit 7 which is connected to the city water supply. Cooled water is withdrawn from the storage container 6 for use when desired through a conduit 8 which may extend to a faucet (not shown) positioned on the refrigerator 1 or which may extend, if desired, to a faucet located at a sink. This arrangement provides for a continuous supply of cooled water, the water being supplied to the storage container 6 from the main city water supply and being withdrawn from the container when it is desired for use.

In order to provide for relatively fast cooling of the water in the storage container 6 and to substantially conceal the storage container, this container is positioned, as shown, closely adjacent the evaporator 5. The evaporator 5 may operate at a temperature in the general range from 15° F. to 20° F. Since this is substantially below the freezing point of the water in the storage container 6, the danger exists that the water therein may freeze, particularly during periods of extended inactivity with respect to cooled water requirements, with resultant damage to the storage container or to the conduits associated therewith. In order to obviate this difficulty I have provided arrangements for automatically supplying heat to the water in the storage container 6 whenever the temperature of the water therein reaches a predetermined minimum, for example, 40° F. In the form shown in Fig. 1 this arrangement includes a conduit 9 which is connected at one end 10 to the lower portion of the storage container 6 for receiving water therefrom and at the other end 11 to the top of the storage container 6 for returning water thereto. The portion 12 of the conduit 9 is common with the water supply conduit 7, the conduit 9 being joined with the water supply conduit 7 at the T connection 13.

Many conventional refrigerators are provided with a natural draft condenser for cooling and condensing compressed refrigerant before the refrigerant is supplied to the evaporator 5. In the form shown in Fig. 1, this condenser 14 includes a flat metal sheet 15 spaced slightly from the rear wall portion of the outer wall 2 and refrigerant-conducting tubing 16 which is secured to the plate 15. Because of the heat dissipated to the plate from the refrigerant flowing through the tubing 16, the condenser 14 may operate at a temperature about 20° F. above ambient temperature, for example, at a temperature of 110° F. This relatively high temperature of the condenser 14 is utilized in accordance with my invention in supplying heat to water circulating through the conduit 9 under proper conditions. Thus, an upwardly extending vertical section 17 of the conduit 9 is secured to the plate 15 of the condenser and receives heat therefrom. A thermostatic valve 18 is provided at the storage container 6 adjacent the inlet end 19 of the conduit 9. This valve may be of any conventional type well known in the art arranged to be responsive to the temperature of the water in the storage container 6. The valve is chosen so as to open to permit flow of water through the conduit 9 whenever the temperature of the water within the storage container 6 reaches a predetermined minimum temperature, for example, 40° F. As the water passes through the vertical section 17 of the conduit 9 heat is supplied thereto from the condenser 14, and the warmed water returns to the storage container 6 through the conduit section 12, thereby raising the temperature of the body of water within the storage container 6. The flow of water through the closed circulating system formed by the conduit 9 and the storage container 6 continues until the water within the storage container reaches some predetermined maximum temperature, for example, 45° F., at which the thermostatic valve 18 closes, discontinuing circulation through the conduit 9. It can be seen that, by this arrangement, freezing of water within the storage container 6 is prevented, and a source of heat readily available in conventional refrigerators is utilized for preventing the freezing of water in the storage container. If desired, the section 17 of the conduit 9, in lieu of being secured to the condenser 14, may merely be positioned within the space between the condenser 14 and the rear wall portion of the outer wall 2. This space is somewhat above ambient temperature because of heat received from the condenser 14.

In order to secure the maximum thermal head for convection flow through the conduit 9, the connections of this conduit to the storage container 6 are positioned substantially at the top and the bottom of the storage container. In some cases, as in the form shown in Fig. 1, a portion of the conduit 9 outside the outer wall 2 of the refrigerator may extend below the inlet end of this conduit. Where this is true, as in the case of the downwardly extending section 19 of the conduit 9 shown in Fig. 1, such downwardly extending section is surrounded by some heat-insulating material 19a in order to minimize the addition of heat to the water in this portion of the conduit. Such addition of heat to the conduit section 19 would tend to reduce convection flow through the conduit 9. In order to minimize transfer of heat through the conduit 9 itself to the water in the storage tank 6, the conduit 9 may be made of a material of relatively low thermal conductivity. Alternatively, as in the form shown in Fig. 1, the conduit 9 may be made of conventional metal, heat-conducting tubing, but sections 20 and 21 of a material of relatively low thermal conductivity are inserted therein to provide a thermal break.

The water cooling arrangement may be conveniently assembled within the refrigerator 1 by the construction disclosed. Thus, the water cooling arrangement may be mounted on a sub-assembly 22 including an outer wall section 23, forming, in the assembled position, a portion of the outer wall 2 and a spaced inner wall section 24 forming, in the assembled position, a section of the inner wall 3. Heat-insulating material 25 is provided between the spaced wall sections 23 and 24. The storage container 6 is supported on the sub-assembly 22 and is positioned adjacent the inner wall section 24. The conduit sections 12 and 10 and the conduit 8 extend through the wall sections 23 and 24 and are surrounded by grommets 26 which are formed of rubber or similar resilient material and engage both the conduits and the wall sections to provide seals. A gasket 27 is provided between the inner wall 3 of the refrigerator and the inner wall section 24 of the sub-assembly, and a similar gasket 28 is provided between the outer wall 2 and the outer wall section 23 of the sub-assembly. The sub-assembly is mounted on the outer wall and is secured in sealing position by screws 29 or similar fastening devices.

In Fig. 2 there is shown a modified form of my invention. This form may be employed in connection with refrigerators wherein a natural draft condenser of the type shown at 14 in Fig. 1 is not utilized or where, for any reason, it is desired to arrange the conduit 9 within the space between the inner and outer walls of the refrigerator. In this form the circulating conduit 9 is connected to the storage container 6 in the same manner as previously described in connection with Fig. 1, but the upwardly extending vertical section 17 of the conduit 9 is disposed within the space 30 between the inner and outer walls of the refrigerator and this conduit section 17 is secured in heat transfer relationship with the outer wall section 23 of the sub-assembly 22 which forms part of the outer wall 2 of the refrigerator. When the water in the storage container 6 reaches a predetermined minimum temperature, for example, 40° F., the thermostatic valve 18 opens to provide circulation of water from the storage tank 6 through the conduit 9. Since the outer wall 2 of the refrigerator is normally at a substantially higher temperature than the temperature of the water within the storage container 6, heat is supplied from the outer wall 2 of the refrigerator to the conduit section 17 and to the water circulating therethrough. The warmed water is returned to the storage container 6 in the manner previously described, raising the temperature of the body of water stored therein. The circulation of water through the conduit 9 continues until the temperature of the water in the storage container reaches a predetermined maximum, for example, 45° F., at which the thermostatic valve 18 closes, discontinuing the circulation through the conduit 9. As illustrated in Fig. 2, a sub-assembly in the general form of the sub-assembly 22 of Fig. 1 is used. However, if such sub-assembly is not employed for any reason the outer wall section 23 could be formed as an integral portion of the outer wall 2 of the refrigerator and, similarly, inner wall section 24 illustrated could be an integral part of the inner wall 3 of the refrigerator. If desired, the conduit section 17 in the form shown in Fig. 2 may be positioned outside the outer wall 2 where the conduit section 17 would be subject to the ambient temperature existing outside the refrigerator 1. Since the outer wall 2 of the refrigerator is normally at substantially ambient temperature, the heat supplied to the conduit 9 would be substantially the same as that received in the form shown in Fig. 2 where the section 17 is secured directly to the outer wall 2.

While I have shown and described specific embodiments of my invention, I do not desire my invention to be limited to the particular constructions shown and described and I intend, by the appended claims, to cover all modifications within the spirit and scope of my invention.

What I claim as new and desire to secure by Letters Patent of the United States is:

1. In a refrigerator or the like including a storage compartment and an evaporator for cooling said storage compartment, a water cooling arrangement including a storage container for water disposed in said storage compartment adjacent the evaporator whereby water therein is cooled by said evaporator, a conduit having both ends connected to said container in communication with the water therein to provide a closed water circulating path with said container, said conduit including a single vertical portion exposed to ambient temperature whereby heat is supplied to the water in said vertical portion of said conduit thereby to induce circulation of water through said conduit and said container, and means dependent on the temperature of the water in said container for controlling circulation of water through said conduit.

2. In a refrigerator or the like including a storage compartment and an evaporator for cooling said storage compartment, a water cooling arrangement including a storage container for water disposed in said storage compartment adjacent the evaporator whereby water therein is cooled by said evaporator, a conduit having both ends connected to said container in communication with the water therein to provide a closed water circulating path with said container, said conduit including a single vertical portion disposed adjacent a portion of said refrigerator maintained at least at ambient temperature whereby heat is supplied to the water in said vertical portion of said conduit thereby to induce circulation of water through said conduit and said container, and means dependent on the temperature of the water in said container for controlling circulation of water through said conduit.

3. In a refrigerator or the like including a storage compartment, an evaporator for cooling said storage compartment, and a condenser, a water cooling arrangement including a storage container for water disposed in said storage compartment adjacent the evaporator whereby water therein is cooled by said evaporator, a conduit having both ends connected to said container in communication with the water therein to provide a closed water circulating path with said container said conduit including a single vertical portion, means for supplying heat to said vertical portion of said conduit from said condenser whereby the water in said vertical portion of said conduit is heated and circulation of water through said conduit and said container is induced, and means dependent on the temperature of the water in said container for controlling circulation of water through said conduit.

4. In a refrigerator or the like including a storage compartment, an evaporator for cooling said storage compartment, and a condenser, a water cooling arrangement including a storage container for water disposed in said storage compartment adjacent the evaporator whereby water therein is cooled by said evaporator, a conduit having both ends connected to said container in communication with the water therein to provide a closed water circulating path with said container, a single vertical portion of said conduit being disposed adjacent said condenser for receiving heat therefrom whereby the water in said vertical portion of said conduit is heated and circulation of water through said conduit and said container is induced, and means dependent on the temperature of the water in said container for controlling circulation of water through said conduit.

5. In a refrigerator or the like including an outer wall, a spaced inner wall defining a food storage compartment, heat-insulating material between said walls and an evaporator within said compartment for cooling said compartment, a water cooling arrangement comprising a storage container for water within said compartment adjacent said evaporator whereby water therein is cooled by said evaporator, a conduit having both ends connected to said container in communication with the water therein to provide a closed water circulating path with said container, a portion of said conduit being secured to said outer wall whereby heat is transferred from said outer wall to said portion of said conduit, and means dependent on the temperature of the water in said container for controlling circulation of water through said conduit.

6. In a refrigerator or the like including a storage compartment, an evaporator for cooling said storage compartment, and a condenser, a water cooling arrangement including a storage container for water disposed adjacent the evaporator whereby water therein is cooled by said evaporator, a conduit having both ends connected to said container in communication with the water therein to provide a closed water circulating path with said container, said conduit including a vertical section secured to said condenser whereby heat is transmitted from said condenser to said conduit and causes upward circulation of water in said section of said conduit, and means dependent on the temperature of the water in said container for controlling circulation of water through said conduit.

7. In a refrigerator or the like including a storage compartment and an evaporator for cooling said storage compartment, a water cooling arrangement including a storage container for water disposed adjacent said evaporator whereby water therein is cooled by said evaporator, a conduit having both ends connected to said container in communication with the water therein to provide a closed water circulating path with said container, said conduit including a first vertical section extending downwardly from the bottom portion of said container, said first vertical section being surrounded by heat-insulating material, said conduit further including a second vertical section extending upwardly to the top portion of said container, at least a portion of said second section being exposed to ambient temperature whereby heat is supplied to the water in said portion of said second section, and means dependent on the temperature of the water in said container for controlling circulation of water through said conduit.

8. In a refrigerator or the like including a storage compartment, an evaporator for cooling said storage compartment and a condenser, a water cooling arrangement including a storage container for water disposed adjacent said evaporator whereby water therein is cooled by said evaporator, a conduit having ends connected to said container in communication with the water therein to provide a closed water circulating path with said container, said conduit including a first vertical section extending downwardly from the bottom portion of said container, said first vertical section being surrounded by heat-insulating material, said conduit further including a second vertical section extending upwardly to the top portion of said container, at least a portion of said second section being disposed adjacent said condenser whereby heat is supplied from said condenser to the water in said portion of said second section of said conduit, and means dependent on the temperature of the water in said container for controlling circulation of water through said conduit.

9. In a refrigerator or the like including an outer wall, a spaced inner wall defining a food storage compartment, heat-insulating material between said walls and an evaporator within said compartment for cooling said compartment, a water cooling arrangement comprising a storage container for water within said compartment adjacent said evaporator whereby water therein is cooled by said evaporator, a conduit having both ends connected to said container in communication with the water therein to provide a closed water circulating path with said container, said conduit including a first vertical section extending downwardly from the bottom portion of said container, said first vertical section being disposed between said walls and within said heat-insulating material, said conduit further including a second vertical section extending upwardly to the top portion of said container, at least a portion of said second section being secured to said outer wall whereby heat is transmitted from said outer wall to said portion of said conduit, and means dependent on the temperature of the water in said container for controlling circulation of water through said conduit.

HOWARD A. WYMAN, Jr.

References Cited in the file of this patent

UNITED STATES PATENTS

| Number | Name | Date |
|---|---|---|
| 1,692,223 | Pinkerton | Nov. 20, 1928 |
| 1,726,093 | Williams | Aug. 27, 1929 |
| 1,863,249 | Morairty | June 14, 1932 |